United States Patent [19]
Hayes

[11] Patent Number: 5,267,662
[45] Date of Patent: Dec. 7, 1993

[54] CONTAINER

[75] Inventor: Norman J. Hayes, Bridger, Mont.

[73] Assignee: Blackbelt Manufacturing Company, Wyo.

[21] Appl. No.: 834,406

[22] Filed: Feb. 12, 1992

[51] Int. Cl.⁵ ............................................. B65D 6/00
[52] U.S. Cl. .................................. 220/4.12; 220/625; 119/61; 52/DIG. 9
[58] Field of Search ................... 220/4.01, 4.04, 4.12, 220/571, 571.1, 625, 890, 307, DIG. 19; 52/DIG. 9; 152/379.3, 379.5, 382, 383; 119/61; 215/247, 355, 363

[56] References Cited

U.S. PATENT DOCUMENTS

| | | |
|---|---|---|
| 2,199,845 | 5/1940 | Wolf . |
| 2,592,638 | 4/1952 | Andrew . |
| 3,038,512 | 6/1962 | Staton . |
| 3,074,377 | 1/1963 | Spencer .................................. 119/54 |
| 3,621,611 | 11/1971 | Wingerter ....................... 52/DIG. 9 |
| 4,274,465 | 6/1981 | Allbert et al. ..................... 152/379.5 |
| 4,363,420 | 12/1982 | Andrews ............................. 220/307 |
| 4,364,335 | 12/1982 | Livingston ............................ 119/61 |
| 4,401,144 | 8/1983 | Wilde .................................. 152/158 |
| 4,646,932 | 3/1987 | Masler ................................ 220/307 |
| 4,732,198 | 3/1988 | Frerichs et al. ..................... 152/544 |
| 4,741,446 | 5/1988 | Miller ................................ 215/247 |

Primary Examiner—Allan N. Shoap
Assistant Examiner—Nova Stucker
Attorney, Agent, or Firm—Wells, St. John, Roberts, Gregory & Matkin

[57] ABSTRACT

A container constructed of a used tire and a seal plate which is inserted in the wheel opening of the tire. The seal plate has a formed circumferential edge which snaps into place around the bead of the tire. When a sealant such as a cold vulcanizing agent is used to bind the circumferential edge of the seal plate to the tire, a water tight container is provided.

5 Claims, 2 Drawing Sheets

CONTAINER

BACKGROUND OF THE INVENTION

This invention relates to a container constructed from used vehicle tires.

There is a problem in disposing of used tires. The present invention can be used with used tires to convert these tires into useful containers. For example, used tires as containers could be used as feed bunks or stock watering devices. These containers being constructed of rubber withstand weathering and since they are pliable, stock will not damage the containers by kicking or stepping on them.

Further, when the tires are turned inside out with machine tools already in the marketplace, the tire is converted into a container having a greater axial depth than with tires which have not been turned inside out. Such an article has the advantage of being capable of holding more contents than would be the case if the tire were not turned inside out.

SUMMARY OF THE INVENTION

The present invention provides a container formed by a used tire and a seal plate which is inserted in the wheel opening of the tire. The seal plate has a formed circumferential edge which snaps into place around the bead of the tire. When a sealant such as a cold vulcanizing agent is used to bind the circumferential edge of the seal plate to the tire, a water tight container is provided.

More specifically, the container is preferably a rubber vehicle tire having a wheel opening in combination with a disc shaped seal plate. The seal plate has a circumferential edge formed with an upper protrusion and a lower protrusion. A notch is formed between the upper protrusion and the lower protrusion. When installing the seal plate into a tire, the size of the disc plate and the notch require a bead of the vehicle tire to be forced into the notch. An interference fit forcibly traps the bead inside the notch. In a preferred embodiment, the vehicle tire is turned inside out or inverted before installation of the disc plate on the tire. Additionally, a water sealant may be used to seal the upper protrusion to the wall of the tire to prevent water from leaking past the disc plate when the container is filled with water.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
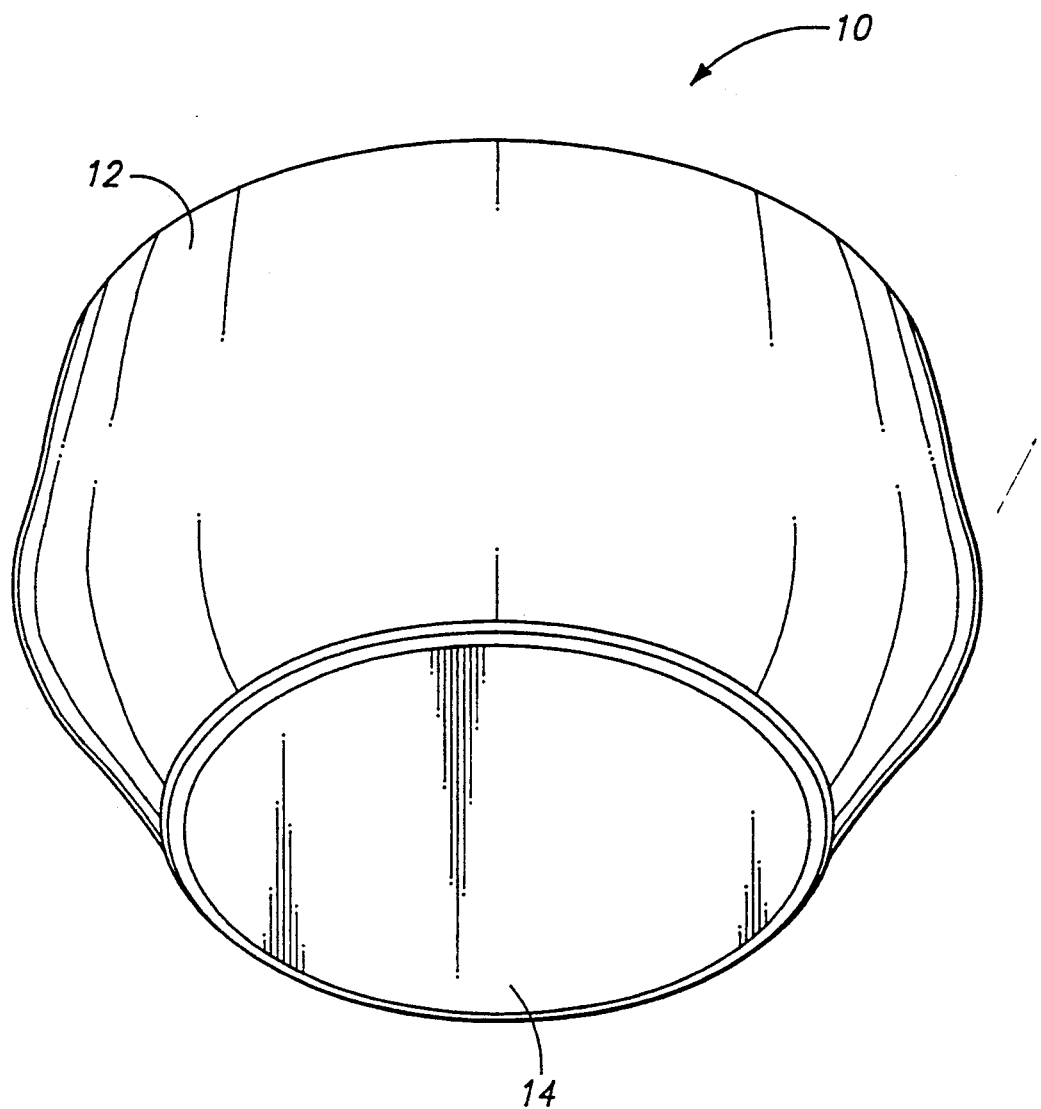
FIG. 1 is a perspective view of a used tire being turned inside out with the seal plate installed according to the present invention.
Figure 2:
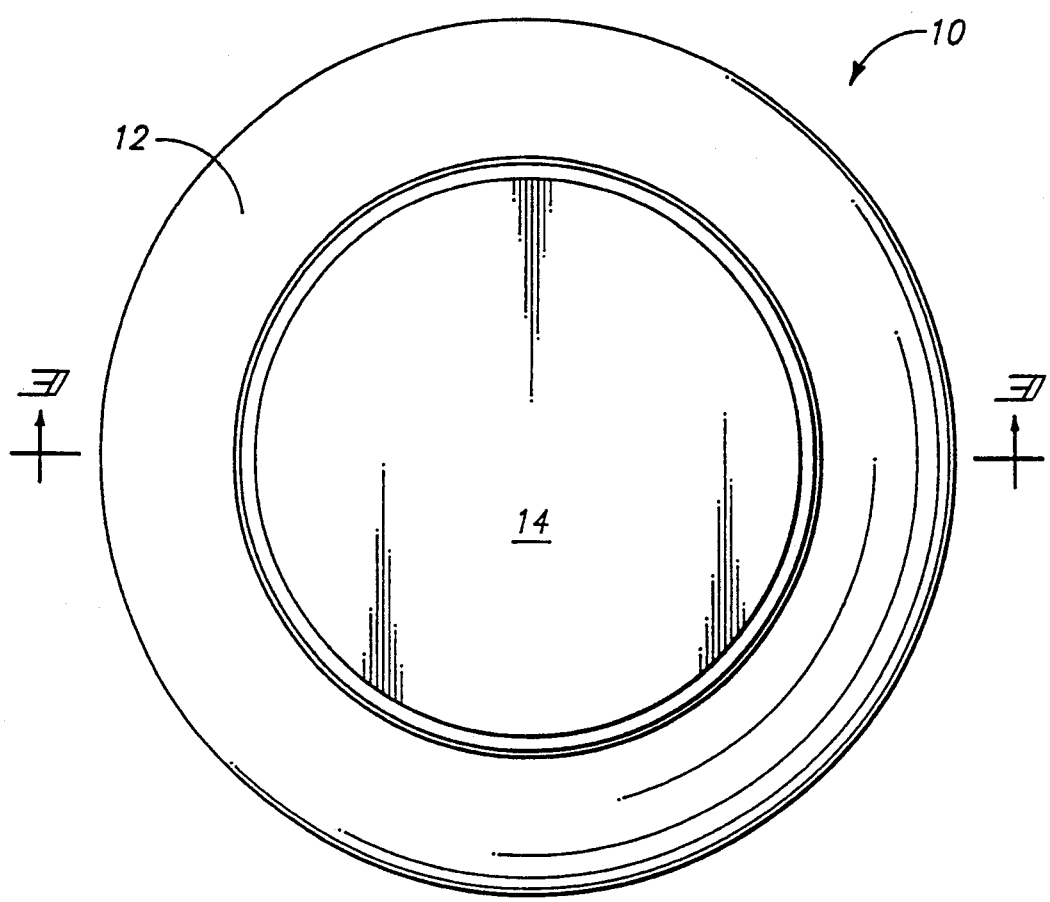
FIG. 2 is a top view of the device shown in FIG. 1.

As shown in FIG. 1, container 10 is shown constructed of a used tire 12 which has been turned inside out and a disc shaped seal plate 14.

In a preferred embodiment, the seal plate 14 is formed of rubber material but it is also contemplated that this seal plate could be constructed of other materials such as metal or wood.

The circumferential edge of the seal plate 14 is formed to have an upper protrusion 16 and a lower protrusion 18. A notch 20 is formed between these two protrusions.

Figure 3:
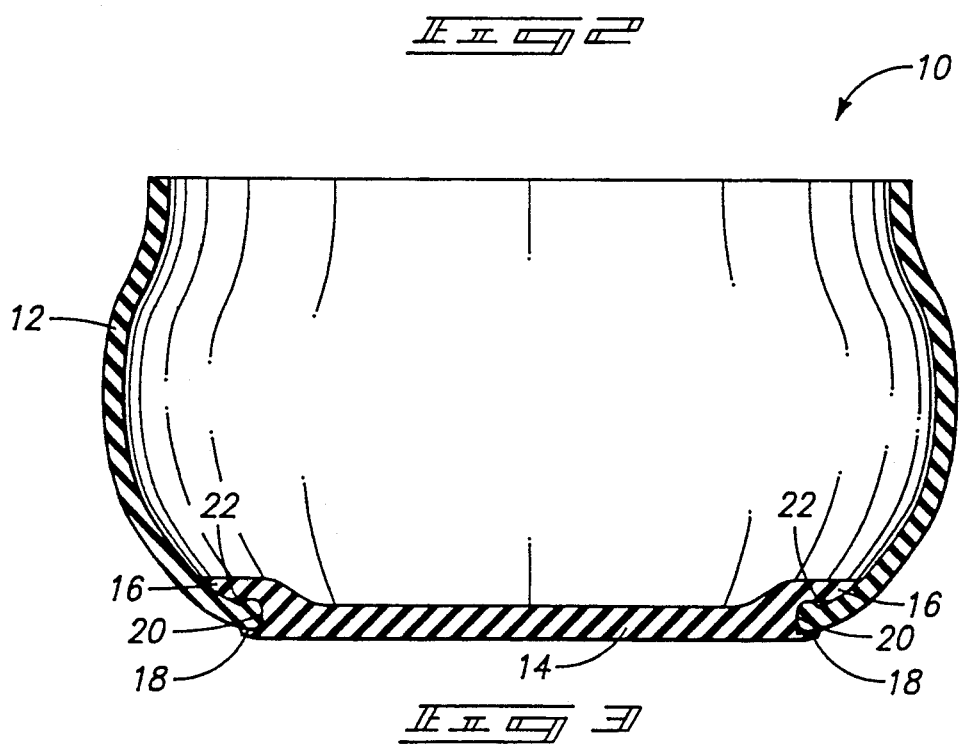
FIG. 3 is a cross-sectional view taken along the line 3—3 in FIG. 2.

Notch 20 is sized to receive a bead of the inverted tire as shown in FIG. 3 with the upper protrusion 16 lying along the wall of the tire on the inside of the container 10 and the lower protrusion 18 lying on the wall of the tire outside the container 10.

The seal plate 14 is sized to be snapped into place in the wheel opening of the used tire thereby trapping the bead of the tire within the notch so that the seal plate is not easily removed once it is inserted.

In a preferred embodiment, a sealant such as a cold vulcanizing agent 22 is used to adhere the upper protrusion 16 to the wall of the tire so that the container may be used for holding water or other liquids.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. An open-ended container for holding contents, comprising:
   a tire having an opening;
   a bead formed along an edge of said opening;
   a flexible, planar disc-shaped seal plate;
   a first protrusion and a second protrusion, said first and second protrusions being flexible and extending circumferentially radially outwardly from the seal plate;
   a notch defined by said first and second protrusions, said notch being flexible and complimentary in size to said bead such that said bead is snapped into said notch and securely held within said notch, said first protrusion flexibly sealingly engaging a first wall of the tire and said second protrusion flexibly sealingly engaging a second wall of the tire to form a seal between said seal plate and said tire to provide a continuous bottom surface for the container, said first wall of the tire forming an inside wall of the container and said second wall of the tire forming an outside wall of the container.

2. A container according to claim 1 wherein the tire is inverted such that the inverted tire has a greater axial depth than a similar noninverted tire in order to hold a greater amount of contents.

3. A container according to claim 1 wherein said first protrusion is oriented above said second protrusion and said planar seal plate is oriented in a horizontal position to provide a support base for supporting the container on a support surface, only the planar seal plate being positioned between the inside of the container and the support surface.

4. A container according to claim 1, further comprising:
   a water sealant positioned between said first protrusion and said first wall of said tire to form a watertight seal between the tire and the seal plate.

5. A container according to claim 4 wherein the seal plate and the tire are made of rubber, the water sealant being a vulcanizing agent to adhere the seal plate to the tire to form said water-tight seal.

* * * * *